(12) United States Patent
Yishay et al.

(10) Patent No.: US 11,442,973 B2
(45) Date of Patent: Sep. 13, 2022

(54) SYSTEM AND METHOD FOR STORING AND QUERYING DOCUMENT COLLECTIONS

(71) Applicant: Verint Systems Ltd., Herzliya Pituach (IL)

(72) Inventors: Yitshak Yishay, Revava (IL); Shlomo Rothschild, Nitzan (IL)

(73) Assignee: COGNYTE TECHNOLOGIES ISRAEL LTD., Herzliya Pitauch (IL)

( * ) Notice: Subject to any disclaimer, the term of this patent is extended or adjusted under 35 U.S.C. 154(b) by 422 days.

(21) Appl. No.: 16/658,323

(22) Filed: Oct. 21, 2019

(65) Prior Publication Data

US 2020/0142916 A1 May 7, 2020

(30) Foreign Application Priority Data

Oct. 24, 2018 (IL) .......................................... 262576

(51) Int. Cl.
*G06F 16/33* (2019.01)
*G06F 16/31* (2019.01)

(52) U.S. Cl.
CPC ........ *G06F 16/3347* (2019.01); *G06F 16/325* (2019.01)

(58) Field of Classification Search
CPC .... G06F 16/3347; G06F 16/325; G06F 16/71; G06F 16/7834; G06G 16/7328
See application file for complete search history.

(56) References Cited

U.S. PATENT DOCUMENTS

| | | | |
|---|---|---|---|
| 7,797,265 B2* | 9/2010 | Brinker | G06F 16/353 706/45 |
| 9,600,568 B2 | 3/2017 | Rangan | |
| 2014/0039840 A1 | 2/2014 | Yuen et al. | |
| 2015/0211845 A1 | 7/2015 | Le Grand et al. | |
| 2019/0037358 A1 | 1/2019 | Jenkins et al. | |

OTHER PUBLICATIONS

Bao, J. et al., "Location-based and Preference-Aware Recommendation Using Sparse Geo-Social Networking Data," Proceedings of the 20th International Conference on Advances in Geographic Information Systems, ACM, 2012, pp. 199-208.

(Continued)

*Primary Examiner* — Baoquoc N To
(74) *Attorney, Agent, or Firm* — ISUS Intellectual Property PLLC; Anthony Jason Mirabito (57) ABSTRACT

A system for storing document collections in a manner that facilitates efficient querying. Each document vector is hashed, by applying a suitable hash function to the components of the vector. The hash function maps the vector to a particular hash value, corresponding to a particular hyperbox in the multidimensional space to which the vectors belong. The vector, or a pointer to the vector, is then stored in a hash table in association with the vector's hash value. Subsequently, given a document of interest, documents similar to the document of interest may be found by hashing the vector of the document of interest, and then returning the vectors that are associated, in the hash table, with the resulting hash value.

10 Claims, 6 Drawing Sheets

(56) References Cited

OTHER PUBLICATIONS

Quercia, D., et al., "Recommending Social Events from Mobile Phone Location Data," 2010 IEEE 10the International Conference on Data Mining (ICDM), IEEE, Sydney, Australia, Dec. 14-17, 2010, 6 pages.

Ramos, J., "Using tf-idf to Determine Word Relevance in Document Queries," Department of Computer Science, Rutgers University, 2013, 4 pages.

Rekimoto, J., et al., "LifeTag: WiFi-Based Continuous Location Logging for Life Pattern Analysis," LoCA., Proceedings of the Third International Symposium, Oberpfaffenhofe, Germany, Sep. 20-21, 2007, pp. 35-49.

Search Report, dated Feb. 18, 2020, received in connection with corresponding EP Patent Application No. 19204931.0.

Stein, B., "Principles of Hash-based Text Retrieval," SIGIR '07 Workshop on Learning to Rank for Information Retrieval, Jul. 23-27, 2007, pp. 527-534.

Chi, L., et al., "Hashing Techniques: A Survey and Taxonomy," ACM Computing Surveys, vol. 50, No. 1, Article 11, 2017, 36 pages.

Turney, P., et al., "From Frequency to Meaning: Vector Space Models of Semantics," Journal of Artificial Intelligence Research, vol. 37, 2010, pp. 141-188.

\* cited by examiner

\# SYSTEM AND METHOD FOR STORING AND QUERYING DOCUMENT COLLECTIONS

FIELD OF THE DISCLOSURE

The present disclosure relates to the field of information organization and retrieval.

BACKGROUND OF THE DISCLOSURE

U.S. Pat. No. 7,797,265 describes the clustering of documents from a data stream by first generating a feature vector for each document. A set of cluster centroids (e.g., feature vectors of their corresponding clusters) are retrieved from a memory based on the feature vector of the document using a locality sensitive hashing function. The centroids may be retrieved by retrieving a set of cluster identifiers from a cluster table, the cluster identifiers each indicative of a respective cluster centroid, and retrieving the cluster centroids corresponding to the retrieved cluster identifiers from a memory. Documents may then be clustered into one or more of the candidate clusters using distance measures from the feature vector of the document to the cluster centroids.

SUMMARY OF THE DISCLOSURE

There is provided, in accordance with some embodiments of the present disclosure, an apparatus that includes a memory and a processor. The processor is configured to organize a collection of information items, by representing the information items by different respective vectors in a multidimensional space, mapping the vectors, at respective ones of the scales, to respective regions of the multidimensional space that are represented by different respective hash values, using a set of hash functions that correspond to different respective scales, and storing the hash values in a data structure in the memory, such that each of the regions is associated with (i) any of the vectors that are mapped to the region, and (ii) any others of the regions that are at least partly contained within the region. The processor is further configured to, subsequently to organizing the collection, using the data structure, identify a subset of the information items that are similar to another information item. The processor is further configured to output the identified subset.

In some embodiments, the information items include respective electronic documents.

In some embodiments, the vectors are term frequency-inverse document frequency (tf-idf) vectors.

In some embodiments, the regions are hyperboxes.

In some embodiments, the data structure includes a hash table.

In some embodiments, the scales include a default scale, and the processor is configured to map the vectors to the respective regions by:

mapping the vectors at the default scale, subsequently to mapping the vectors at the default scale, iteratively remapping a first subset of the vectors at successively smaller ones of the scales, until no more than a first predefined threshold number of the vectors are mapped to any given region of the multidimensional space, and subsequently to iteratively remapping the first subset of the vectors, iteratively remapping a second subset of the vectors at successively larger ones of the scales, until no fewer than a second predefined threshold number of the vectors are mapped to each of the regions.

In some embodiments, the processor is configured to identify the subset of the information items that are similar to the other information item by:

representing the other information item by another vector, using the set of hash functions, identifying a particular one of the regions to which the other vector can be mapped, which is at a smaller one of the scales than any other one of the regions to which the other vector can be mapped, and identifying the subset of the information items, based on an association of the particular one of the regions, in the data structure, with the subset.

In some embodiments, the scales include a default scale, and the processor is configured to identify the particular one of the regions by:

using the set of hash functions, hashing the other vector, at the default scale, to a default-scale hash value, ascertaining that the default-scale hash value is stored in the data structure, and responsively to ascertaining that the default-scale hash value is stored in the data structure, iteratively remapping the other vector at successively smaller ones of the scales, until the other vector has been mapped to the particular one of the regions.

In some embodiments, the scales include a default scale, and the processor is configured to identify the particular one of the regions by:

using the set of hash functions, hashing the other vector, at the default scale, to a default-scale hash value, ascertaining that the default-scale hash value is not stored in the data structure, and responsively to ascertaining that the default-scale hash value is not stored in the data structure, iteratively remapping the other vector at successively larger ones of the scales, until the other vector has been mapped to the particular one of the regions.

In some embodiments, the other information item is a first other information item, and the processor is further configured to add a second other information item to the collection, by:

representing the second other information item by another vector, using the set of hash functions, identifying a particular one of the regions to which the other vector can be mapped, which is at a smaller one of the scales than any other one of the regions to which the other vector can be mapped, and associating the particular one of the regions, in the data structure, with the other vector.

There is further provided, in accordance with some embodiments of the present disclosure, a method that includes organizing a collection of information items, by representing the information items by different respective vectors in a multidimensional space, mapping the vectors, at respective ones of the scales, to respective regions of the multidimensional space that are represented by different respective hash values, using a set of hash functions that correspond to different respective scales, and storing the hash values in a data structure such that each of the regions is associated with (i) any of the vectors that are mapped to the region, and (ii) any others of the regions that are at least partly contained within the region. The method further includes, subsequently to organizing the collection, using the data structure, identifying a subset of the information items that are similar to another information item, and outputting the identified subset.

The present disclosure will be more fully understood from the following detailed description of embodiments thereof, taken together with the drawings, in which:

DETAILED DESCRIPTION OF EMBODIMENTS

Introduction

Many applications call for storing and querying large collections of electronic documents (i.e., files containing text). Typically, for such applications, the documents in the collection are represented by respective vectors, and a suitable distance metric, which quantifies the degree of similarity between any pair of documents, is defined. For example, in many applications, each document is represented by a vector of term frequency-inverse document frequency (tf-idf) statistics. (Optionally, techniques such as Principal Component Analysis (PCA) may be used to reduce the dimensionality of the tf-idf vectors, and after the dimensionality reduction, the vectors may be normalized.) The degree of similarity between two documents may be quantified, for example, using the cosine similarity measure, which is the cosine of the angle between the respective tf-idf vectors of the documents.

Given that, as described above, each document is represented by a vector, the terms "document" and "vector" may be used interchangeably in the present description.

Overview

It is often challenging to store a collection of documents in a manner that facilitates efficiently querying the collection. For example, given a particular document of interest, a user may query the document collection for a certain number of documents that have content similar to that of the document of interest. However, with a large collection, it may be prohibitively expensive to calculate the degree of similarity between the document of interest and every document in the collection.

To address this challenge, embodiments of the present disclosure provide a system configured to store document collections in a manner that facilitates efficient querying. Per this technique, each document vector is hashed, by applying a suitable hash function to the components of the vector. The hash function maps the vector to a particular hash value, corresponding to a particular hyperbox in the multidimensional space to which the vectors belong. The vector, or a pointer to the vector, is then stored in a hash table in association with the vector's hash value. (Thus, vectors that are similar to each other may be mapped to the same hash value.) Subsequently, given a document of interest, documents similar to the document of interest may be found by hashing the vector of the document of interest, and then returning the vectors that are associated, in the hash table, with the resulting hash value.

More particularly, in embodiments of the present disclosure, a set (or "family") of hash functions is defined, each function in the set corresponding to a different respective scale, or hyperbox size. In particular, one of the functions corresponds to a default scale so, while the other functions correspond, respectively, to other scales $\{ \ldots, s_{-2}, s_{-1}, s_1, s_2, \ldots \}$ that are progressively smaller or larger than the default scale. There is generally no limit to the number of hash functions that may be included in the set, and hence no limit to the number of scales at which the vectors can be hashed.

Subsequently to defining the set of hash functions, the hash functions are used to organize the collection. First, each vector $\bar{v}_i$ in the collection is mapped, at the default scale $s_0$ using the hash function $f_0(\bar{v})$, to a hash value $f_0(\bar{v}_i)$, and is then associated with $f_0(\bar{v}_i)$ in the hash table. Next, for each default-scale hash value in the hash table, the number of vectors associated with the hash value is ascertained. If this number is greater than a first predefined threshold $N_1$, each of the vectors $\bar{v}_j$ associated with the hash value is mapped to a respective smaller-scale hash value $f_{-1}(\bar{v}_j)$, and is then associated with $f_{-1}(\bar{v}_j)$ in the hash table. In addition, $f_{-1}(\bar{v}_j)$ is associated with $f_0(\bar{v}_j)$ in the hash table. ($f_{-1}(\bar{v}_j)$ may then be referred to as a "child" of $f_0(\bar{v}_j)$, and $f_0(\bar{v}_j)$ as a "parent" of $f_{-1}(\bar{v}_j)$.) $\bar{v}_j$ may then be disassociated from $f_0(\bar{v}_j)$, or alternatively, continue to be associated with both $f_0(\bar{v}_j)$ and $f_{-1}(\bar{v}_j)$.

Subsequently, for each hash value at scale $s_{-1}$, the number of vectors associated with the hash value is ascertained. If this number is greater than $N_1$, each of the vectors associated with the hash value is moved or copied to a new hash value at scale $s_{-2}$, and the new hash value is associated with the $s_{-1}$ hash value in the hash table. This process is then repeated for scale $s_{-2}$, and for each subsequent smaller scale for which at least one hash value was generated.

Next, beginning at the lowest scale $s_L$ for which at least one hash value was generated, the number of vectors associated with each of the hash values is ascertained. If this number is less than a second predefined threshold $N_2$ ($N_1$ being less than $N_2$), each vector $\bar{v}_k$ associated with the hash value is disassociated from $f_L(\bar{v}_k)$, and, if the vector is not already associated in the hash table with $f_{L+1}(\bar{v}_k)$, this association is made. This process is then repeated for scale $s_{L+1}$, and for each subsequent higher scale for which at least one hash value was generated. Any hash values that, as a result of this procedure, are not associated with any vectors or child hash values, are removed from the hash table.

Subsequently to organizing the collection, a user, or the system itself, may query the collection for N documents that are similar (although not necessarily most similar) to a particular document of interest $\bar{v}_d$. In response to this query, the system finds the lowest scale $s_m$ for which the hash value $f_m(\bar{v}_d)$ is stored in the hash table, and then returns N vectors from $f_m(\bar{v}_d)$. In the event that $f_m(\bar{v}_d)$ is mapped to fewer than N vectors, the system may return all of the vectors mapped to $f_m(\bar{v}_d)$, along with supplementary vectors from child hash values of $f_m(\bar{v}_d)$, and/or from other related hash values, such as parents or siblings of $f_m(\bar{v}_d)$.

In particular, the system first hashes the vector of the document of interest at scale so, using $f_0(\bar{v})$. Subsequently, if the resulting hash value $f_0(\bar{v}_d)$ is not stored in the hash table, the system iteratively hashes the vector at progressively larger scales (beginning with $s_1$), until the hash value $f_m(\bar{v}_d)$, at scale $s_m$, appears in the table. The system then returns the vectors in $f_m(\bar{v}_d)$, along with, if necessary, vectors from related hash values. Alternatively, if $f_0(\bar{v}_d)$ is stored in the hash table, the system iteratively hashes the vector at progressively smaller scales (beginning with $s_{-1}$), until the smallest scale $s_m$ for which $f_m(\bar{v}_d)$ is stored in the table is found. The system then returns the vectors from $f_m(\bar{v}_d)$, along with, if necessary, vectors from related hash values.

To add a vector $\bar{v}_q$ to the collection, the system finds the lowest scale $s_m$ for which the hash value $f_m(\bar{v}_q)$ is stored in the hash table, and then adds the vector to $f_m(\bar{v}_q)$. After a predefined threshold number of additions to the collection have been performed, the system may iterate through the hash table and, as appropriate, shift some of the vectors to a smaller scale. To remove a vector from the collection, the system simply disassociates the vector from the vector's hash value. If the resulting number of vectors associated with the hash value is less than $N_2$, the hash value may be removed, and the remaining associated vectors moved to a higher scale. After a predefined threshold number of additions and/or removals have been performed, the system may reinitialize the hash table.

It is emphasized that the present disclosure offers multiple advantages over other document-organization schema. For example, the number of, sizes of, and boundaries of the hyperboxes represented in the hash table are not predefined, but rather, are adaptively defined in response to the content of the document collection. Moreover, there is no limit to the number of hyperboxes that may be defined. This facilitates returning a more relevant set of results for any given query. Furthermore, since the hyperbox size at each scale is known, the closeness of the query results to the document of interest may be readily ascertained from the scale from which the query results were retrieved. Furthermore, the hash table is simple to navigate, in that each hash value points to its children. Moreover, vectors may be added to, or deleted from, the collection without necessitating large changes to hash table.

It is noted that the techniques described herein may be used for storing and querying collections of any type of information item that may be represented by a vector. Examples include electronic documents and electronic media files (e.g., pictures, videos, or audio files), which may be represented, for example, by respective tf-idf vectors or other suitable vector representations. Other examples include locations, which may be represented by respective coordinate vectors. Yet other examples include the properties or characteristics of people, places, or devices. For example, a person's interests may be represented by a vector of numbers, each number indicating the extent to which the person is interested in a particular topic. As another example, the state of a smartphone may be represented by a vector of zeros and ones, where each element in the vector corresponds to a particular app, and a one indicates that the app is installed on the smartphone. Nevertheless, for simplicity, the present description generally refers to collections of documents.

System Description

Figure 1:
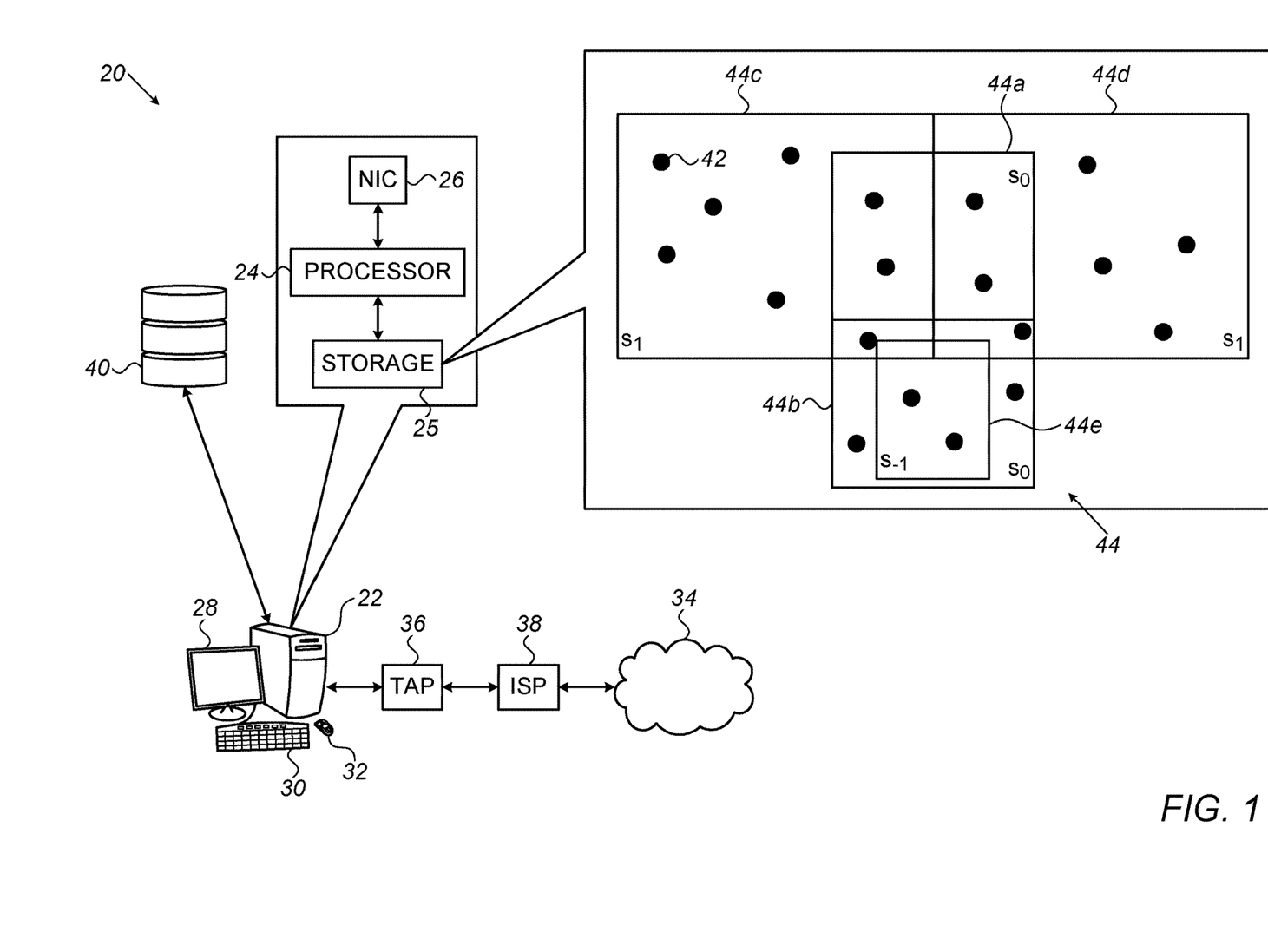
FIG. 1 is a schematic illustration of a system for organizing and querying a collection of documents, in accordance with some embodiments of the present disclosure.

Reference is initially made to FIG. 1, which is a schematic illustration of a system 20 for organizing and querying a collection of documents, in accordance with some embodiments of the present disclosure. System 20 comprises a server 22, which typically comprises a processor 24, a storage drive 25, such as a hard disk drive or flash drive, and a network interface, such as a network interface controller (NIC) 26.

As described in detail below, processor 24 is configured to organize and then search a collection of documents. In some embodiments, the documents belonging to the collection are acquired by processor 24 from a network 34, such as the Internet, via NIC 26. For example, system 20 may comprise a network tap 36 that taps network communication passing through an internet service provider (ISP) 38, and passes this communication to server 22, such that the communication is received by the processor via the NIC. The processor may then extract any documents satisfying one or more criteria—such as any documents communicated from or to a particular network address—from this communication. Alternatively or additionally, processor 24 may execute a web crawler, which, via NIC 26, browses network 34 for documents that satisfy the one or more criteria, and downloads these documents to the server.

Alternatively or additionally, a user may supply the server with documents for the collection. Typically, server 22 comprises user-interfacing peripherals, such as a monitor 28, a keyboard 30, and a mouse 32, which facilitate this function. For example, using the peripherals, the user may instruct processor 24 to download one or more particular documents from network 34. Alternatively or additionally, the user may connect an external drive, which stores various documents, to the server, and instruct processor 24 to copy the documents from the external drive. Alternatively or additionally, documents may be acquired by processor 24 in any other suitable way.

Typically, the number of collected documents is relatively large, e.g., greater than 10,000,000, 100,000,000, or even 1,000,000,000. Due to this large size, the documents are typically stored, at least partly, externally to server 22. For example, as depicted in FIG. 1, the documents may be stored in a database 40 that may, for example, be distributed over multiple storage servers that are cooperatively networked with server 22.

In general, processor 24 may be embodied as a single processor, or as a cooperatively networked or clustered set of processors. In some embodiments, the functionality of processor 24, as described herein, is implemented solely in hardware, e.g., using one or more Application-Specific Integrated Circuits (ASICs) or Field-Programmable Gate Arrays (FPGAs). In other embodiments, the functionality of processor 24 is implemented at least partly in software. For example, in some embodiments, processor 24 is embodied as a programmed digital computing device comprising at least a central processing unit (CPU) and random access memory (RAM). Program code, including software programs, and/or data are loaded into the RAM for execution and processing by the CPU. The program code and/or data may be downloaded to the processor in electronic form, over a network, for example. Alternatively or additionally, the program code and/or data may be provided and/or stored on non-transitory tangible media, such as magnetic, optical, or electronic memory. Such program code and/or data, when provided to the processor, produce a machine or special-purpose computer, configured to perform the tasks described herein.

Organizing the Document Collection

By way of introduction to the description that follows, FIG. 1 schematically illustrates the manner in which the collection of documents is organized by processor 24.

To organize the documents, the processor first represents the documents by different respective vectors 42 in a multidimensional space. For example, each of vectors 42 may be a tf-idf vector. (As noted above in the Introduction, the processor may reduce the dimensionality of, and/or normalize, each vector 42.) Typically, the number of components in each vector—and hence the dimensionality of the multidimensional space to which the vectors belong—is much greater than two. For ease of illustration, however, FIG. 1 shows a two-dimensional space, in which each of vectors 42 has two components.

Next, using a set of hash functions that correspond to different respective scales (or "levels of precision"), the processor maps the vectors, at respective ones of the scales, to respective regions 44—e.g., hyperboxes—of the multidimensional space, which are represented by different respective hash values. In other words, the processor applies, to each vector, a hash function $f_k(\bar{v})$ corresponding to the scale $s_k$, and the resulting hash value represents the region 44 to which the vector is mapped. (In general, given that there is a one-to-one correspondence between regions 44 and the hash values that represent these regions, the present description may use the terms "hash value" and "region" interchangeably in certain cases; for example, a vector may be said to be "mapped to" or "contained in" the region that contains the vector, or the hash value that represents this region.)

One of the scales, $s_0$, is designated as the default scale. Regions at the default scale have a default size. Regions at progressively larger scales than $s_0$ are progressively larger than the default size, while regions at progressively smaller scales than $s_0$ are progressively smaller than the default size. Whereas regions at the same scale do not overlap each other, regions at different scales may overlap, in that a region at scale $s_k$ may be partly or fully contained within one or more regions at the next-largest scale $s_{k+1}$. For example, purely by way of illustration, FIG. 1 shows a first region 44a and a second region 44b, each of which is at the default scale $s_0$. First region 44a spans two larger regions, a third region 44c and a fourth region 44d, each of which is at the next-largest scale $s_1$. (Thus, it may be said that first region 44a is a child of both third region 44c and fourth region 44d.) Second region 44b also partially overlaps third region 44c and fourth region 44d, and additionally contains a fifth region 44e, which is at the next-smallest scale $s_{-1}$. (Thus, it may be said that second region 44b is a child of both third region 44c and fourth region 44d, and is a parent of fifth region 44e.)

As further described below, each vector $\bar{v}$ is mapped to the smallest region that contains, in total, at least a threshold number $N_2$ of vectors, including $\bar{v}$. In some embodiments, the vector is additionally mapped to one or more larger regions that contain the vector; typically, however, the vector is mapped only to the smallest region. For example, in the case shown in FIG. 1, the two vectors contained in both fifth region 44e and second region 44b may be mapped to fifth region 44e, but not to second region 44b. Nonetheless, as described below with reference to FIG. 2, processor 24 lists fifth region 44e as a child of second region 44b, such that the two vectors in fifth region 44e may be said to be indirectly mapped to second region 44b.

Figure 2:
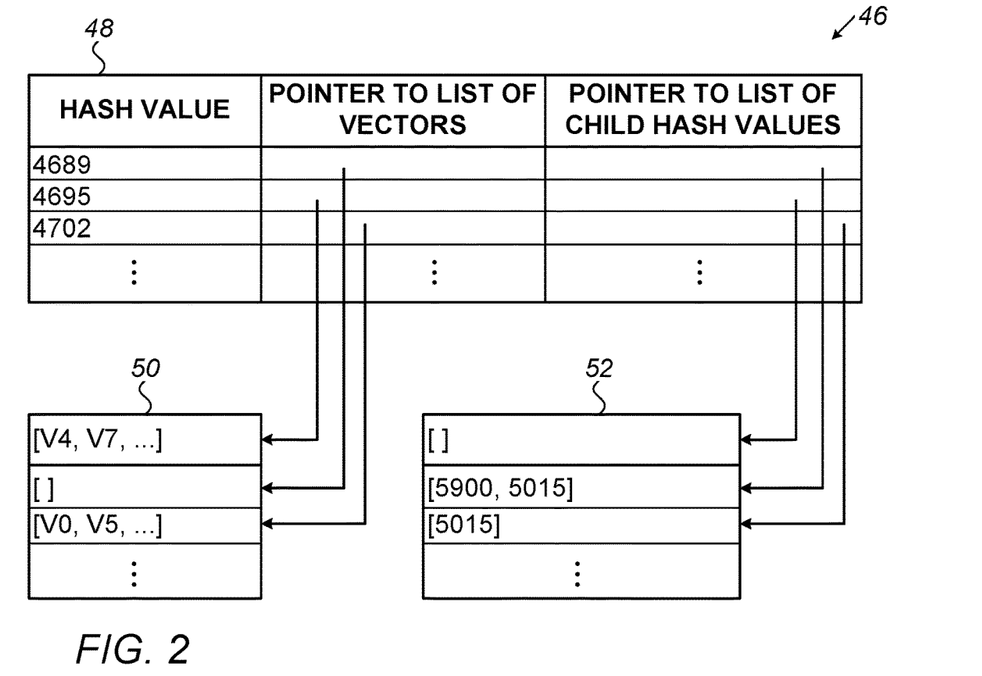
FIG. 2 is a schematic illustration of a data structure for storing hash values, in accordance with some embodiments of the present disclosure.

Reference is now made to FIG. 2, which is a schematic illustration of a data structure 46 for storing hash values, in accordance with some embodiments of the present disclosure.

Data structure 46 stores the organizational scheme for the document collection. In particular, the hash values that represent regions 44 are stored in data structure 46 such that each of the regions is associated with (i) any of the vectors that are mapped to the region, and (ii) any other regions that are at least partly contained within the region. For example, referring again to FIG. 1, second region 44b may be associated with fifth region 44e, and also with the four vectors that are mapped to second region 44b but not to fifth region 44e. Processor 24 may store data structure 46 in any suitable memory, such as storage drive 25 or a remote memory that stores some or all of database 40.

Typically, data structure 46 includes a hash table (or "hash map") 48, in which the keys of table are the hash values that represent regions 44, respectively. Typically, hash table 48 maps each key to at least two values: (i) a list of vectors mapped to the region represented by the key, or a pointer to such a list, and (ii) a list of child hash values at the next-smallest scale that represent, respectively, those regions that are at least partly contained in the region represented by the key, or a pointer to such a list. (The column headers in hash table 48 are shown in FIG. 2 purely for illustration purposes; in practice, such headers are typically not stored.)

For example, given M hash values, the processor may construct two arrays of length M: a first array 50, which stores the respective list of vectors mapped to each hash value, and a second array 52, which stores the respective list of child hash values of each hash value. (Alternatively to storing the actual vectors, first array 50 may store pointers to the addresses in database 40 at which the vectors are stored.) Hash table 48 may then map each hash value to two pointers: a first pointer that points to an element in first array 50, and a second pointer that points to an element in second array 52.

For sake of illustration, FIG. 2 shows a snippet of a hypothetical hash table and its associated arrays. In this snippet, a first hash value 4689 is mapped to an empty list of vectors, and to two child hash values, 5900 and 5015. This indicates that the region represented by the hash value 4689 has two children—namely, the regions represented, respectively, by the hash values 5900 and 5015—and that no vectors are directly mapped to this region. A second hash value 4695 is mapped to a list of vectors $[V_4, V_7, \ldots]$, and to an empty list of child hash values. This indicates that the vectors $[V_4, V_7, \ldots]$ are mapped to the region represented by the hash value 4695, and that this region has no children. Finally, a third hash value 4702 is mapped to another list of vectors $[V_0, V_5, \ldots]$, and to the child hash value 5015. Since, as explained above, a child region may be contained in more than one parent, multiple hash values may be mapped to the same child hash value, as in the case of the child hash value 5015.

In some embodiments, each hash value is also mapped to a list of its parent hash values. Thus, for example, with reference to FIG. 2, the hash value 5015 may be mapped to a list of parent hash values that includes the hash values 4689 and 4702. Alternatively or additionally, each hash value may be mapped to a centroid vector, i.e., the mean of all of the vectors that are mapped to the hash value. These additional columns in the hash table may facilitate responding to a query, and particularly, selecting supplementary vectors from related hash values.

For example, the processor may receive a query for N vectors that are similar to a particular vector of interest, and, in response to the query, map the vector of interest to a particular hash value. If this hash value contains fewer than N vectors, the processor may use the list of parent hash values to quickly look up the parents and siblings of the hash value. The processor may then select, from the children, parents, and siblings of the hash value, the hash value whose centroid is closest to the vector of interest. Subsequently, the processor may select the supplementary vectors from the selected related hash value.

Notwithstanding the particular example shown in FIG. 2, it is noted that the scope of the present disclosure includes any suitable data structure that stores the relationships between the hash values. This data structure may be accompanied by any suitable auxiliary data structures, such as one or more arrays or lists. For simplicity, however, the remainder of the description assumes the particular set of data structures shown in FIG. 2.

Figure 3A:
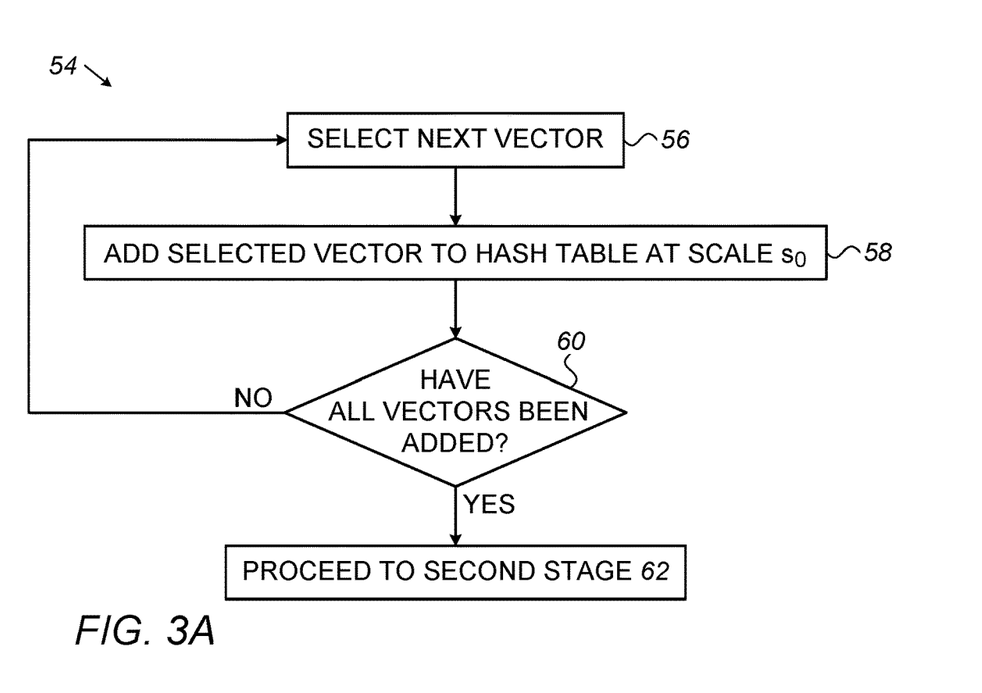
FIGS. 3A-C are flow diagrams for respective stages in the mapping of vectors to regions, in accordance with some embodiments of the present disclosure.
Figure 3B:
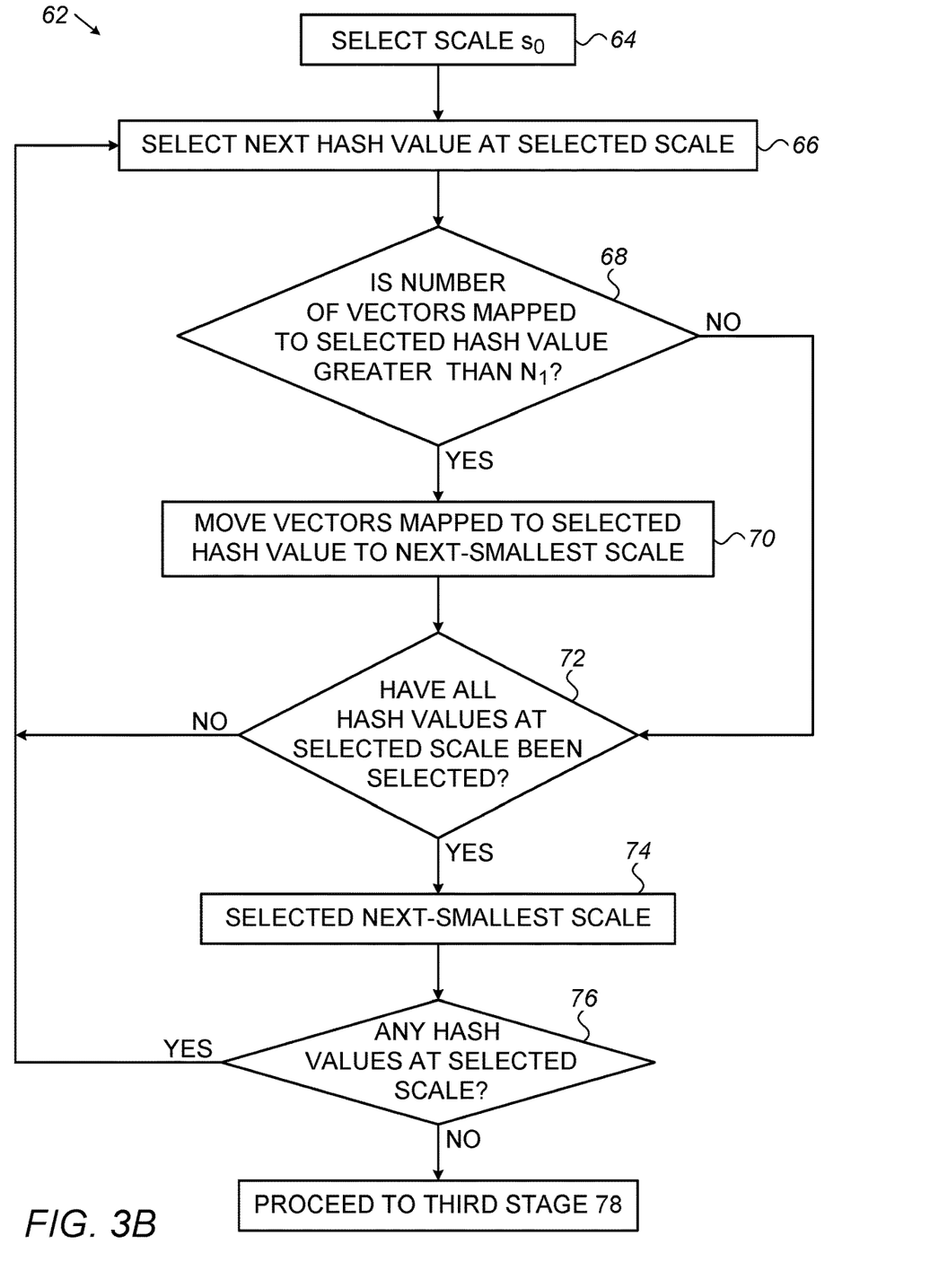
Figure 3C:
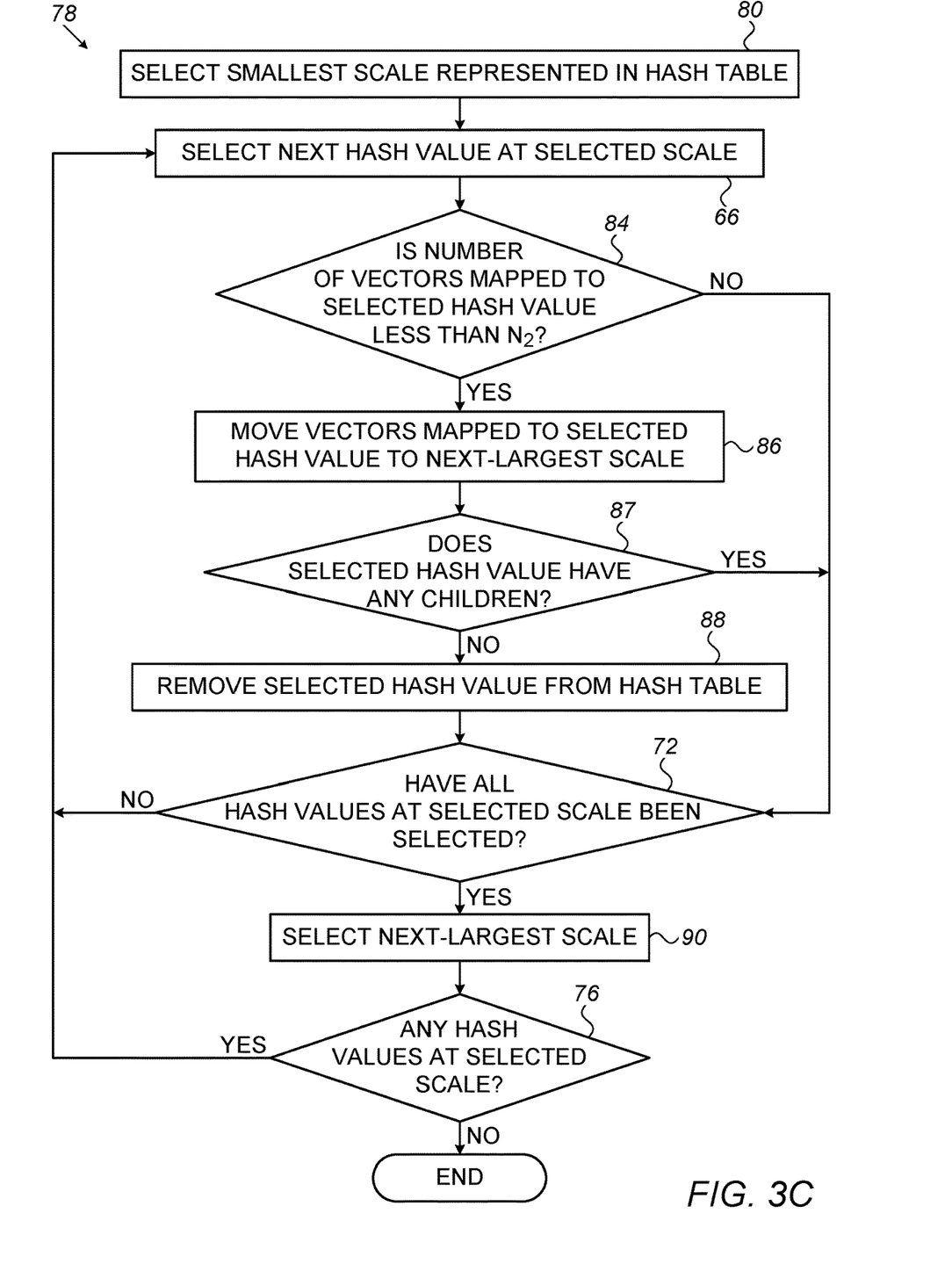

Reference is now made to FIGS. 3A-C, which are flow diagrams for respective stages in the mapping of vectors 42 to regions 44, in accordance with some embodiments of the present disclosure.

In some embodiments, to map vectors 42 to regions 44 and construct data structure 46, the processor uses the technique illustrated in FIGS. 3A-C. For ease of illustration and description, this technique is separated into three different stages: a first stage 54, illustrated in FIG. 3A, a second stage 62, illustrated in FIG. 3B, and a third stage 78, illustrated in FIG. 3C. It is noted, however, that the three stages may be combined, such that, for example, the entire technique is performed by a single software module executed by processor 24. (FIGS. 3A-C assume that respective vectors have already been computed for all of the collected documents, and that an appropriate family of hash functions has already been defined.)

First stage 54 begins at a vector-selecting step 56, at which the processor selects a vector from the collection. Next, at a vector-adding step 58, the processor adds the selected vector to hash table 48 at the default scale $s_0$. In other words, the processor hashes the selected vector using $f_0(\overline{v})$ and then associates the resulting hash value with the selected vector in the hash table. The processor then checks, at a first checking step 60, whether all of the vectors have been added to the data structure. If not, the processor returns to vector-selecting step 56, and then repeats the above-described sequence of steps for the next vector. Otherwise, first stage 54 ends, and the processor proceeds to second stage 62, described immediately below.

Following first stage 54, hash table 48 includes a set of hash values at the default scale so, each hash value mapping to (i) a non-empty list of vectors, and (ii) an empty list of child hash values. In other words, following first stage 54, each vector is mapped to a respective region at the default scale, but not to any smaller-scale regions. Second stage 62 enhances the precision of this mapping, by iteratively remapping a first subset of the vectors at successively smaller scales, until no more than a predefined threshold number $N_1$ of the vectors are mapped to any given region.

Specifically, second stage 62 begins at a default-scale-selecting step 64, at which the processor selects the default scale $s_0$. Subsequently, the processor iteratively processes the hash values at the selected scale. Each iteration begins at a hash-value-selecting step 66, at which the processor selects a hash value at the selected scale. Following this selection, the processor checks, at a second checking step 68, whether the number of vectors mapped to the selected hash value is greater than the predefined threshold $N_1$. If yes, the vectors mapped to the selected hash value are moved to the next-smallest scale, at a first vector-moving step 70. For example, each of the vectors mapped to a hash value at the default scale $s_0$ may be moved to a respective hash value at the scale $s_{-1}$, by applying $f_{-1}(\overline{v})$ to the vector, and then associating the resulting hash value with the vector in the hash table. Each of the new hash values at scale $s_{-1}$ is associated in the table with their parent hash value at scale $s_0$.

Subsequently to moving the vectors, or if the number of vectors mapped to the hash value is not greater than $N_1$, the processor checks, at a third checking step 72, whether all of the hash values at the selected scale were selected. If not, the processor returns to hash-value-selecting step 66, and then processes the next hash value as described above. Otherwise, the processor, at a next-smallest-scale-selecting step 74, selects the next-smallest scale; for example, if the currently selected scale is so, the processor selects $s_{-1}$. Subsequently, the processor checks, at a fourth checking step 76, whether the hash table contains any hash values at the selected scale. If yes, the processor returns to hash-value-selecting step 66, and then processes the next hash value as described above. Otherwise, second stage 62 ends, and the processor proceeds to third stage 78, described immediately below.

Following second stage 62, hash table 48 includes a set of hash values at the default scale $s_0$ and smaller scales. Each hash value is mapped to either (i) a non-empty list of vectors and an empty list of child hash values, or (ii) an empty list of vectors and a non-empty list of child hash values. Typically, as a result of second stage 62, some hash values are mapped to a relatively small number of vectors. Since such a situation may lead to inefficient query-handling, third stage 78 eliminates the sparsely-populated hash values, by iteratively remapping a second subset of the vectors at successively larger scales, until no fewer than a predefined threshold number $N_2$ of vectors are mapped to each of the regions that are represented in the hash table.

Specifically, third stage 78 begins with a smallest-scale-selecting step 80, at which the processor selects the smallest scale represented in the hash table, i.e., the smallest scale for which at least one hash value is stored in the hash table. (This scale may be recorded at the end of second stage 62.) Subsequently, the processor iteratively processes the hash values at the selected scale. Each iteration begins at hash-value-selecting step 66, at which the processor selects a hash value at the selected scale. Following this selection, the processor, at a fifth checking step 84, checks whether the number of vectors mapped to the selected hash value is less than a predefined threshold $N_2$ ($N_1$ being less than $N_2$). If yes, the processor, at a second vector-moving step 86, moves the vectors mapped to the selected hash value to the next-largest scale. Subsequently, the processor checks, at a sixth checking step 87, whether the selected hash value has any child hash values. If not, the processor, at a hash-value-removing step 88, removes the selected hash value from the hash table.

For example, if fewer than $N_2$ vectors are mapped to a particular hash value at scale so, the processor may, for each of these vectors, use the hash function $f_1(\overline{v})$ to hash the vector at scale $s_1$, and then associate the resulting hash value, in the hash table, with the vector. If the particular hash value at scale so does not have any children, the processor may remove the hash value from the table.

Subsequently to moving the vectors and, if necessary, removing the selected hash value, or if the number of vectors mapped to the selected hash value is not less than $N_2$, the processor, at third checking step 72, checks whether all of the hash values at the selected scale were selected. If not, the processor returns to hash-value-selecting step 66, and then processes the next hash value. Otherwise, the processor, at a next-largest-scale-selecting step 90, selects the next-largest scale; for example, if the currently selected scale is so, the processor may select $s_1$. Subsequently, the processor checks, at fourth checking step 76, whether the hash table contains any hash values at the selected scale. If yes, the processor returns to hash-value-selecting step 66, and then processes the next hash value as described above. Otherwise, third stage 78, and hence the organization of the collection, ends.

In some embodiments, the processor, during first stage 54, initializes a queue that contains all of the default-scale hash values. Subsequently, during second stage 62, the processor iteratively selects the hash value at the head of the queue, places the hash value onto a stack, and then performs second checking step 68 as described above. If first vector-moving step 70 is performed, each new hash value is placed at the back of the queue. Subsequently, during third stage 78, the processor iteratively selects the hash value at the top of the stack, and then processes the hash value as described above. Advantageously, this technique may allow the processor to organize the collection more quickly, relative to if the processor were to explicitly iterate through the scales during second stage 62 and third stage 78.

Typically, the threshold $N_2$ is equal to the expected return size, or maximum expected return size, of future queries. For example, if each query is expected to request between 40 and 50 documents that are similar to a given document of interest, $N_2$ may be equal to 50. $N_1$ is typically calculated by multiplying $N_2$ by a predefined factor $\alpha$ between 0 and 1, such as 0.5.

Querying the Document Collection

Figure 4:
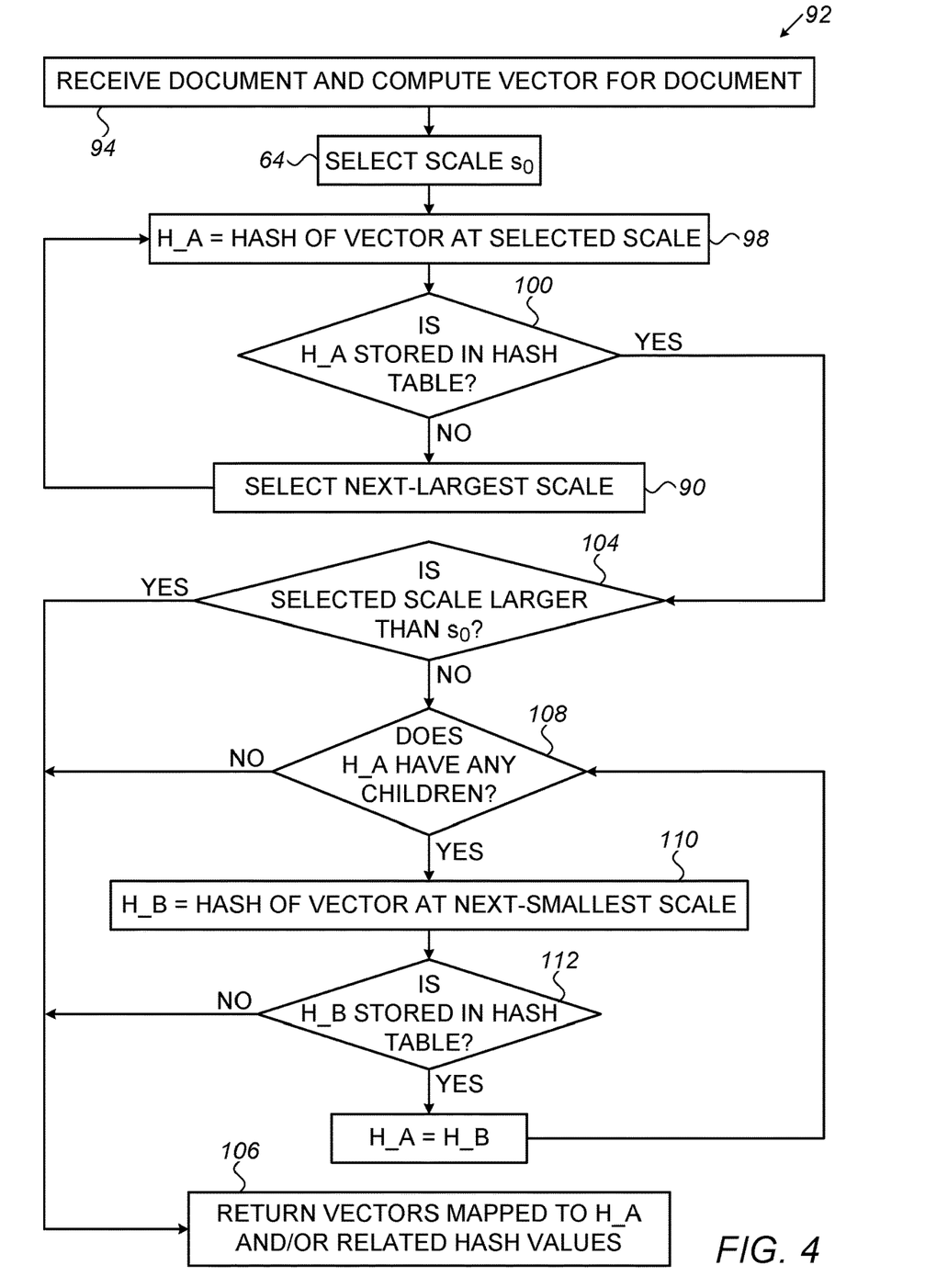
FIG. 4 is a flow diagram for a method for servicing a query, in accordance with some embodiments of the present disclosure.

Reference is now made to FIG. 4, which is a flow diagram for a method 92 for servicing a query, in accordance with some embodiments of the present disclosure.

Subsequently to organizing the document collection as described above with reference to FIGS. 1, 2, and 3A-C, the processor may generate, or receive from a user (e.g., via the user-interfacing peripherals described above with reference to FIG. 1), a query for N documents that are similar to a particular document of interest that does not necessarily belong to the collection. To service this query, the processor, using data structure 46, identifies a subset of the collection including N documents that are similar to the document of interest, and then outputs the identified subset. For example, a list of the similar documents may be output on monitor 28 (FIG. 1).

Typically, to service the query, the processor first uses the set of hash functions to identify the lowest-scale region represented in the hash table to which the vector of interest can be mapped. In other words, the processor identifies the region represented in the hash table to which the vector of interest can be mapped, which is at a smaller scale than any other region represented in the hash table to which the vector of interest can be mapped. The processor then identifies the similar documents that are to be returned, based on an association of this region, in the hash table, with the similar documents. For example, the processor may identify those documents that are mapped directly or indirectly to this region.

In some embodiments, the processor services the query by performing method 92. Method 92 begins at a document-receiving step 94, at which the processor receives the document of interest and computes a vector that represents the document. (If the dimensionality of the vectors in the collection was reduced using a particular dimensionality-reduction matrix, the processor uses the same matrix to reduce the dimensionality of the vector of interest. Alternatively or additionally, if the vectors in the collection were normalized, the processor may normalize the vector of interest.) Subsequently, at default-scale-selecting step 64, the processor selects the default scale $s_0$. Next, at a first hashing step 98, the processor hashes the vector of interest at scale so, by applying the hash function $f_0(\overline{v})$ to the vector. The resulting hash value—referred to herein as the "default-scale hash value"—is assigned to the variable H_A.

Subsequently, at a seventh checking step 100, the processor checks whether H_A is stored in the hash table. If not, the processor iteratively remaps the vector at successively larger scales, until the vector has been mapped to the lowest-scale region represented in the table to which the vector can be mapped. In particular, during each iteration, the processor, at next-largest-scale-selecting step 90, selects the next-largest scale, and then returns to first hashing step 98, thus assigning the hash value at the next-largest scale to H_A.

Following the identification of H_A in the hash table at seventh checking step 100, the processor, at a scale-ascertaining step 104, checks whether the selected scale, at which H_A was computed, is larger than $s_0$. (In other words, the processor checks whether next-largest-scale-selecting step 90 was performed at least once.) If yes, the processor, at a returning step 106, returns the vectors mapped to H_A.

If the number of vectors mapped to H_A is greater than the number N that was requested in the query, the processor may identify the most relevant vectors by computing the distance between the vector of interest and each of the vectors mapped to H_A, and then selecting the N vectors whose distance from the vector of interest is smallest. Alternatively, the processor may return any vector whose distance from the vector of interest is less than a predefined threshold, until N vectors have been returned.

Alternatively, if the number of vectors mapped to H_A is less than N, the processor may supplement these vectors with supplementary vectors that are mapped to related hash values, such as a child, parent, or sibling of H_A. For example, as described above with reference to FIG. 2, hash table 48 may map each hash value to the centroid of the region that is represented by the hash value. Given this information, the processor may compute the distance between the vector of interest and the centroid of each related region, and then, in selecting the supplementary vectors, prioritize those related regions whose respective centroids are closest to the vector of interest.

On the other hand, if the selected scale is so—i.e., if the processor ascertained, at seventh checking step 100, that the default-scale hash value is stored in the hash table—the processor iteratively searches the hash table at successively smaller scales, so as to increase the relevance of the query results as much as possible. In other words, in response to ascertaining that the default-scale hash value is stored in the hash table, the processor iteratively remaps the vector of interest at successively smaller scales, until the vector has been mapped to the region having a smaller scale than any other region represented in the hash table to which the vector can be mapped.

In some embodiments, each of these iterations begins with an eighth checking step 108, at which the processor checks whether H_A has any child hash values. If yes, the processor, at a second hashing step 110, computes H_B, the hash value for the vector of interest at the next-smallest scale. The processor then checks, at a ninth checking step 112, whether H_B is stored in the hash table. If yes, the processor assigns the values of H_B to H_A, and then returns to eighth checking step 108. In other embodiments, eighth checking step 108 is not performed, and each iteration begins with second hashing step 110. (In other words, the processor may compute and search for H_B even if H_B is not listed as a child of H_A.)

Returning now to ninth checking step 112, if H_B is not stored in the hash table, the processor proceeds to returning step 106, and returns the vectors mapped to H_A and/or related hash values. Similarly, for embodiments in which eighth checking step 108 is performed, if H_A does not have any children, the processor proceeds to returning step 106.

In some embodiments, even if the number Z of vectors mapped to H_A is greater than or equal to N, the processor may select K additional vectors from hash values related to H_A. Subsequently, the processor may return, from the Z+K vectors, the N vectors whose distance from the vector of interest is smallest. Alternatively, the processor may return any vector whose distance from the vector of interest is less than a predefined threshold, until N vectors have been returned.

It is noted that method 92 may also be used, *mutatis mutandis*, to add a document to the collection. In particular, the processor may execute method 92 as described above, until returning step 106 is reached. Subsequently, instead of executing returning step 106, the processor may associate H_A (and hence, the region represented by H_A), in the hash table, with the document's vector.

Figure 5:
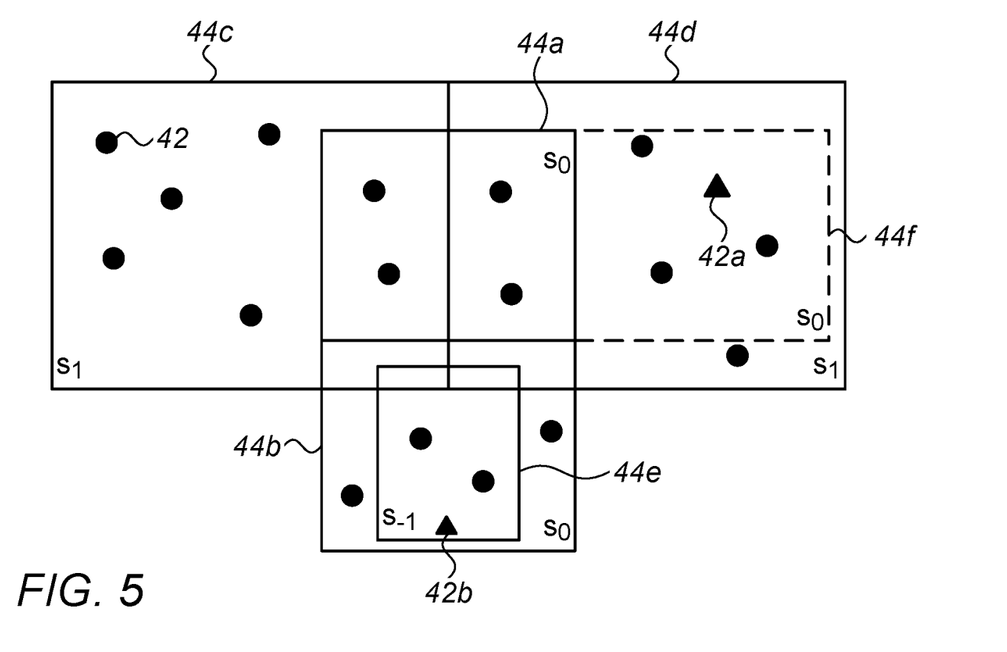
FIG. 5 is a schematic illustration of the querying of a document collection, in accordance with some embodiments of the present disclosure.

Reference is now additionally made to FIG. 5, which is a schematic illustration of the querying of a document collection, in accordance with some embodiments of the present disclosure. FIG. 5 pictorially illustrates various aspects of method 92, with reference to the purely hypothetical (and simplified) organized document collection that was shown in FIG. 1, in which respective hash values represent first region 44a, second region 44b, third region 44c, fourth region 44d, and fifth region 44e.

FIG. 5 illustrates a first hypothetical query, in which a user queries the document collection for a set of documents that are similar to a first document of interest, represented by a first vector 42a. Given this query, the processor first hashes vector 42a at scale so, at first hashing step 98. The processor then ascertains, at seventh checking step 100, that the resulting hash value, which represents a sixth region 44f, is not stored in the hash table. Responsively thereto, the processor rehashes vector 42a at scale $s_1$, and then ascertains that the resulting hash value, which represents fourth region 44d, is stored in the hash table. Responsively thereto, the processor, at returning step 106, returns the vectors contained in fourth region 44d.

FIG. 5 also illustrates a second hypothetical query, in which a user queries the document collection for a set of documents that are similar to a second document of interest, represented by a second vector 42b. Given this query, the processor first hashes vector 42b at scale so, at first hashing step 98. The processor then ascertains, at seventh checking step 100, that the resulting hash value, which represents second region 44b, is stored in the hash table. Responsively thereto, the processor rehashes vector 42b at the next-smallest scale, $s_{-1}$, at second hashing step 110. The processor then ascertains, at ninth checking step 112, that the resulting hash value, which represents fifth region 44e, is stored in the hash table. Subsequently, the processor ascertains, at eighth checking step 108, that fifth region 44e does not have any children. (Alternatively, the processor may rehash vector 42b at scale $s_{-2}$, and then ascertain that the resulting hash value is not stored in the hash table.) Respon-sively thereto, the processor, at returning step 106, returns the vectors contained in fifth region 44e.

The Hash Functions

As described above, embodiments of the present disclosure utilize a set of hash functions $\{f_i(\overline{v})\}$, corresponding to different respective scales $\{s_i\}$, which map any given vector $\overline{v}$ to different respective hash values. In general, any suitable set of hash functions may be used. In one such set, $f_i(\overline{v})$ is equal to $2^{NAT(i)} * \Pi_{j=1}^{D} h_{ij}(v_j)$, where:

(i) NAT(i) is a natural number to which i, the scale index, is mapped, (ii) D is the number of components of $\overline{v}$ (and hence the number of dimensions in the multidimensional space to which the vectors belong), (iii) $v_j$ is the $j^{th}$ component of $\overline{v}$, and (iv) $h_{ij}(x)=p_j(x)^{([x/d_{ij}])}$, where $p_j(x)$ returns a prime number greater than 2, $d_{ij}$ is a predefined denominator, and [ ] indicates rounding up or down to the nearest integer.

For example, NAT(i) may map the scale indices {0, 1, -1, 2, -2, . . . } to the natural numbers {1, 2, 3, 4, 5, . . . }, respectively. Using the series of prime numbers P={3, 5, 7, 11, . . . }, $p_j(x)$ may return the element of P at index 2j-1 if x is positive (such that, for example, $p_1(x)=3$ for x>0), and the element of P at index 2j if x is negative (such that, for example, $p_1(x)=5$ for x<0).

Prior to initializing the document collection, the denominators $d_{ij}$ may be defined, for example, using the following technique:

(i) Choose an integer k that quantifies the approximate number of types (or "classes") of documents that will be represented by the collection, and a "zoom factor" z, which quantifies the ratio between the sizes of the hyperboxes in successive scales, and hence, the approximate ratio between the number of possible hyperboxes in successive scales. Typically, the zoom factor is 2, although other zoom factors (which are greater than one) may alternatively be used.

(ii) For each j between 1 and D, for any integer (corresponding to scale $s_i$), define $d_{ij}$ as $z^{i} * t_j / (k^{1/D})$, where $t_j$ is the difference between the largest vector component and the smallest vector component, over all of the vectors, in the $j^{th}$ dimension.

The integer k may be specified by a user, or may be computed automatically, e.g., by performing a preliminary clustering of the documents.

Although the embodiments described herein mainly address ______, the principles of the present disclosure can also be used for ______. {Eithan—Are there other applications or variations we can mention here?}

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. Apparatus, comprising:
a memory; and
a processor, configured to:
organize a collection of information items, by:
representing the information items by different respective vectors in a multidimensional space,
using a set of hash functions that correspond to different respective scales, mapping the vectors, at respective ones of the scales, to respective regions of the multidimensional space that are represented by different respective hash values, and
storing the hash values in a data structure in the memory, such that each of the regions is associated with (i) any of the vectors that are mapped to the region, and (ii) any others of the regions that are at least partly contained within the region,
subsequently to organizing the collection, using the data structure, identify a subset of the information items that are similar to another information item, and
output the identified subset.

2. The apparatus according to claim 1, wherein the information items include respective electronic documents.

3. The apparatus according to claim 1, wherein the vectors are term frequency-inverse document frequency (tf-idf) vectors.

4. The apparatus according to claim 1, wherein the regions are hyperboxes.

5. The apparatus according to claim 1, wherein the data structure includes a hash table.

6. The apparatus according to claim 1, wherein the scales include a default scale, and wherein the processor is configured to map the vectors to the respective regions by:
mapping the vectors at the default scale,
subsequently to mapping the vectors at the default scale, iteratively remapping a first subset of the vectors at successively smaller ones of the scales, until no more than a first predefined threshold number of the vectors are mapped to any given region of the multidimensional space, and
subsequently to iteratively remapping the first subset of the vectors, iteratively remapping a second subset of the vectors at successively larger ones of the scales, until no fewer than a second predefined threshold number of the vectors are mapped to each of the regions.

7. The apparatus according to claim 1, wherein the processor is configured to identify the subset of the information items that are similar to the other information item by:
representing the other information item by another vector,
using the set of hash functions, identifying a particular one of the regions to which the other vector can be mapped, which is at a smaller one of the scales than any other one of the regions to which the other vector can be mapped, and
identifying the subset of the information items, based on an association of the particular one of the regions, in the data structure, with the subset.

8. The apparatus according to claim 7, wherein the scales include a default scale, and wherein the processor is configured to identify the particular one of the regions by:
using the set of hash functions, hashing the other vector, at the default scale, to a default-scale hash value,
ascertaining that the default-scale hash value is stored in the data structure, and
responsively to ascertaining that the default-scale hash value is stored in the data structure, iteratively remapping the other vector at successively smaller ones of the scales, until the other vector has been mapped to the particular one of the regions.

9. The apparatus according to claim 7, wherein the scales include a default scale, and wherein the processor is configured to identify the particular one of the regions by:
using the set of hash functions, hashing the other vector, at the default scale, to a default-scale hash value,
ascertaining that the default-scale hash value is not stored in the data structure, and
responsively to ascertaining that the default-scale hash value is not stored in the data structure, iteratively remapping the other vector at successively larger ones of the scales, until the other vector has been mapped to the particular one of the regions.

10. The apparatus according to claim 1, wherein the other information item is a first other information item, and wherein the processor is further configured to add a second other information item to the collection, by:
representing the second other information item by another vector,
using the set of hash functions, identifying a particular one of the regions to which the other vector can be mapped, which is at a smaller one of the scales than any other one of the regions to which the other vector can be mapped, and
associating the particular one of the regions, in the data structure, with the other vector.

* * * * *